US012135120B2

(12) United States Patent
Neuer et al.

(10) Patent No.: US 12,135,120 B2
(45) Date of Patent: Nov. 5, 2024

(54) LUMINAIRE WITH ADJUSTABLE LAMP MODULES

(71) Applicant: HLI SOLUTIONS, INC., Greenville, SC (US)

(72) Inventors: Michael Neuer, Covina, CA (US); Dean Dal Ponte, Glendale, CA (US); Syed Raza, Rancho Palos Verdes, CA (US)

(73) Assignee: HLI SOLUTIONS, INC., Greenville, SC (US)

( * ) Notice: Subject to any disclaimer, the term of this patent is extended or adjusted under 35 U.S.C. 154(b) by 154 days.

(21) Appl. No.: 17/379,608

(22) Filed: Jul. 19, 2021

(65) Prior Publication Data

US 2022/0136687 A1 May 5, 2022

Related U.S. Application Data

(63) Continuation of application No. 16/399,130, filed on Apr. 30, 2019, now Pat. No. 11,067,264, which is a continuation of application No. 14/694,773, filed on Apr. 23, 2015, now Pat. No. 10,274,177.

(60) Provisional application No. 62/002,283, filed on May 23, 2014.

(51) Int. Cl.

| | |
|---|---|
| ***F21V 21/00*** | (2006.01) |
| ***F21S 8/08*** | (2006.01) |
| ***F21V 21/30*** | (2006.01) |
| *F21V 7/00* | (2006.01) |
| *F21W 131/10* | (2006.01) |
| *F21Y 105/10* | (2016.01) |

(52) U.S. Cl.
CPC ................ *F21V 21/30* (2013.01); *F21S 8/08* (2013.01); *F21S 8/086* (2013.01); *F21V 7/0091* (2013.01); *F21W 2131/10* (2013.01); *F21Y 2105/10* (2016.08)

(58) Field of Classification Search
CPC .......... F21V 14/02; F21V 21/30; F21V 21/06; F21V 15/01
See application file for complete search history.

(56) References Cited

U.S. PATENT DOCUMENTS 4,419,721 A * 12/1983 Gregoire ................ B60Q 1/245 362/399
5,580,156 A * 12/1996 Suzuki ...................... F21V 7/09 116/63 P
5,584,576 A * 12/1996 Wei Hong .............. F21V 21/26 362/147
8,132,944 B2 * 3/2012 Ruud ......................... F21S 8/02 362/147
8,322,881 B1 * 12/2012 Wassel .................... F21S 8/026 362/217.05
8,801,225 B2 * 8/2014 Dalsgaard ............... F21V 21/30 362/372
8,888,320 B2 * 11/2014 Lueken ................... F21V 17/04 362/329

(Continued)

*Primary Examiner* — Gerald J Sufleta, II
(74) *Attorney, Agent, or Firm* — Buckley, Maschoff & Talwalkar LLC

(57) ABSTRACT

A lamp module includes a rotatable base, a mount, a light emitter, and an optic. The base includes a plate and a projection extending from the plate. The mount is rotatably connected to the projection. The light emitter is connected to the mount. The optic is positioned over the light emitter. The light module can be used with a housing to form a luminaire.

20 Claims, 15 Drawing Sheets

(56) References Cited

U.S. PATENT DOCUMENTS

| | | | | |
|---|---|---|---|---|
| 2005/0047142 | A1* | 3/2005 | Lui | B60Q 1/245 362/286 |
| 2008/0253138 | A1* | 10/2008 | Katz | F21V 21/30 362/427 |
| 2011/0261568 | A1* | 10/2011 | Dalsgaard | F21V 21/30 362/249.03 |
| 2012/0033415 | A1* | 2/2012 | Sharrah | F21V 21/0965 362/199 |
| 2013/0268246 | A1* | 10/2013 | Gordin | F21V 21/14 703/1 |
| 2014/0177258 | A1* | 6/2014 | Gebhard | B60Q 1/245 362/547 |
| 2017/0097146 | A1* | 4/2017 | Wetenkamp | F21V 21/30 |

* cited by examiner

LUMINAIRE WITH ADJUSTABLE LAMP MODULES

FIELD

Exemplary embodiments relate to light fixtures, for example external light fixtures designed to illuminate streets, paths, parking lots, or other areas.

BACKGROUND

Light fixtures, or luminaires, are used with electric light sources to provide an aesthetic and functional housing in both interior and exterior applications. One type of light fixture is a street lamp, generally used for exterior lighting of roads, walkways, parks, parking lots, or other large areas requiring a significant amount of lighting. Street lamps typically include a light fixture attached to a pole or a post to provide an elevated lighting position. In recent years, lighting applications, including street lamps have trended towards the use of light emitting diodes (LEDs) as a light source in place of conventional incandescent and fluorescent lamps.

SUMMARY

According to an exemplary embodiment, a lamp module includes a rotatable base, a mount, a light emitter, and an optic. The base includes a plate and a projection extending from the plate. The mount is rotatably connected to the projection. The light emitter is connected to the mount. The optic is positioned over the light emitter.

According to another exemplary embodiment, a lamp module includes a rotatable base having a projection, a mount, a circuit board, and an optic. The mount is rotatably connected to the projection. The circuit board includes an LED connected and is connected to the mount. The optic has a light directing element positioned over the LED.

In another exemplary embodiment, a light fixture includes a housing and a plurality of lamp modules. The housing includes a support. The light modules include a base rotatably connected to the support. A mount is rotatably connected to the base, a light emitting device connected to the mount having at least one LED, and an optic positioned over the LED.

BRIEF DESCRIPTION OF THE DRAWINGS

The above aspects and features of various exemplary embodiments will be more apparent from the description of the exemplary embodiments taken with reference to the accompanying drawings, in which.

DETAILED DESCRIPTION OF EXEMPLARY EMBODIMENTS

Figure 1:
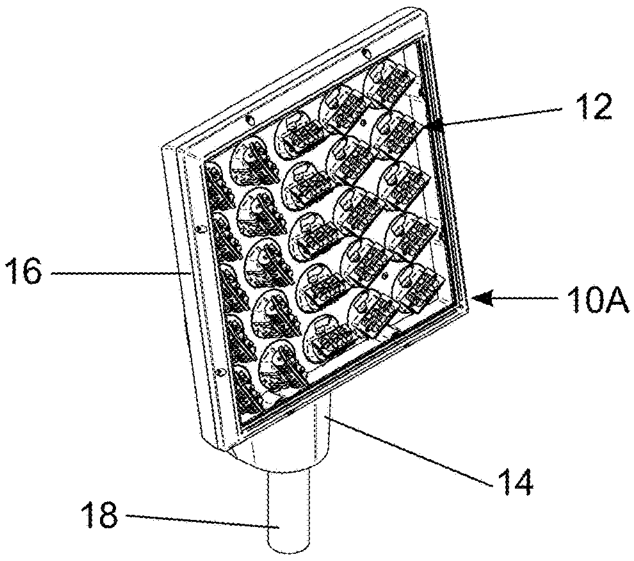
FIG. 1 is a perspective view of a light fixture according to an exemplary embodiment.
Figure 2:
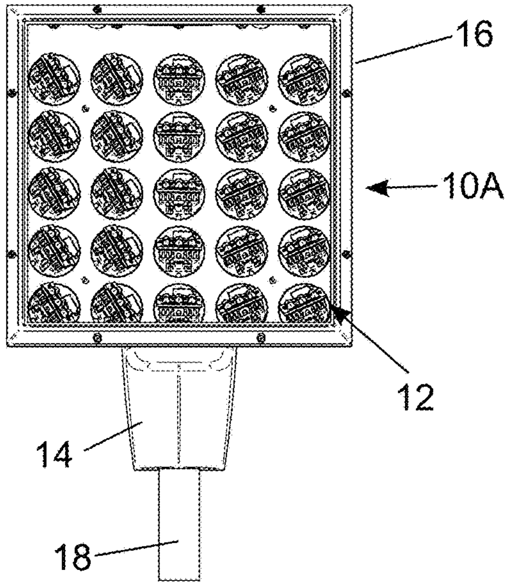
FIG. 2 is a front view of the light fixture of FIG. 1.
Figure 3:
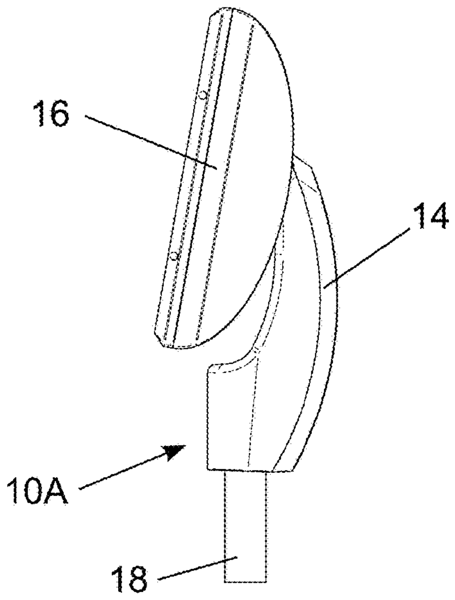
FIG. 3 is a right side view of the light fixture of FIG. 1.

In accordance with various exemplary embodiments, a light fixture assembly includes a housing 10A, 10B and a plurality of lamp modules 12. In various exemplary embodiments the housing 10 is made from aluminum, although other metal, polymer, or composite materials may also be used. The housing 10 can be configured to contain a variety of lamp modules 10 in different patterns based on the desired use and light output. For example, FIGS. 1-4 illustrate a housing using a 5×5 array of lamp modules 12 and FIGS. 5-8 illustrate a housing using a 3×3 array of lamp modules 12. In other alternative embodiments, different patterns of lamp modules 12 are used, including any type of curvilinear, rectilinear, and non-uniform pattern distributions. The lamp modules include one or more light emitters, or example light emitting diode (LED) modules. The housing 10 and lamp modules 12 may utilize other light sources, for example other solid state, electrical filament, fluorescent, plasma, or gas light sources.

FIGS. 1-4 show an exemplary flood light housing 10A designed to be positioned with a substantially vertical orientation. The housing 10A can be mounted to a pole, post, stake, or other similar structure. The housing 10A includes a support 14 and a reflector 16. In the exemplary embodiment shown, the support 14 connects to, or integrally extends from a post 18. The support 14 houses various components to power, direct, and/or control the LED modules as would be understood by one of ordinary skill in the art. The components may include drivers, power sources, power converters, motors, and/or communication equipment such as Wi-Fi or Bluetooth capable equipment.

Reflector 16 is pivotally connected to the support 14, and according to the illustrated embodiment is rotatable with respect to the post 18 to allow a user to selectively direct light emitted from the reflector 16. In an exemplary embodiment, the rotation of the reflector 16, measured by the relative position between a longitudinal axis of the reflector 16 and the longitudinal axis of the post 18, is between approximately −5 degrees and +30 degrees. In an alternative embodiment, the rotation of the reflector 16 is between 0 degrees and +20 degrees.

Figure 4:
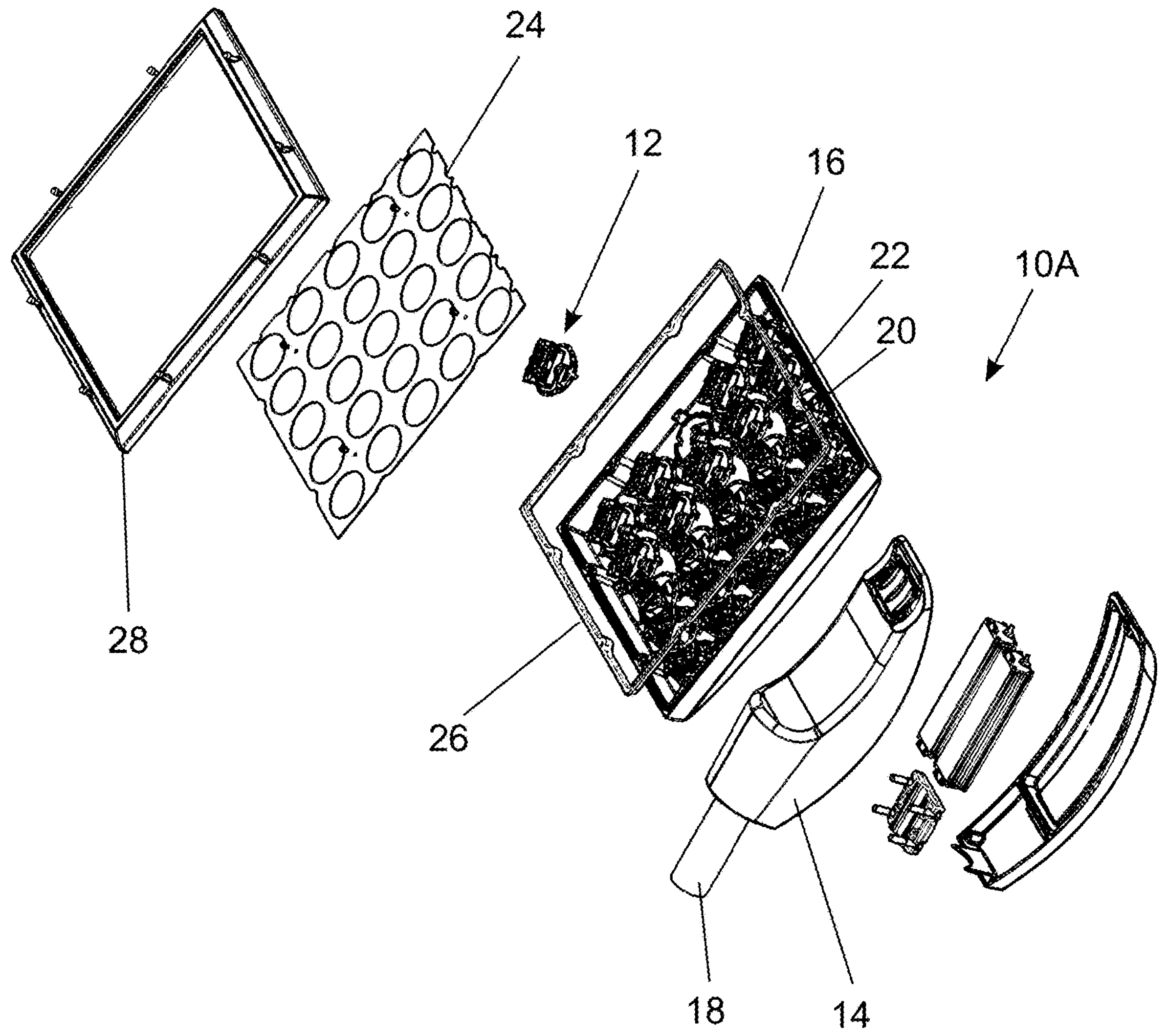
FIG. 4 is a perspective, exploded view of the light fixture of FIG. 1.
Figure 5:
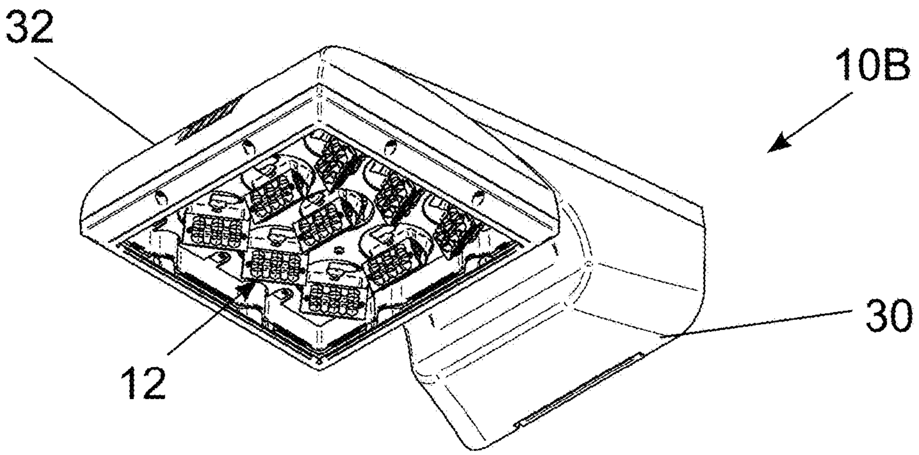
FIG. 5 is a perspective view of a light fixture according to another exemplary embodiment.
Figure 6:
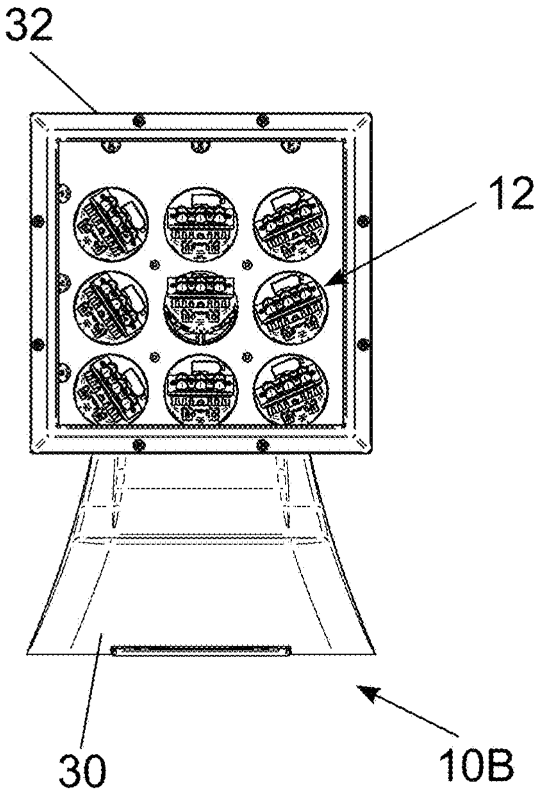
FIG. 6 is a front view of the light fixture of FIG. 5.
Figure 7:
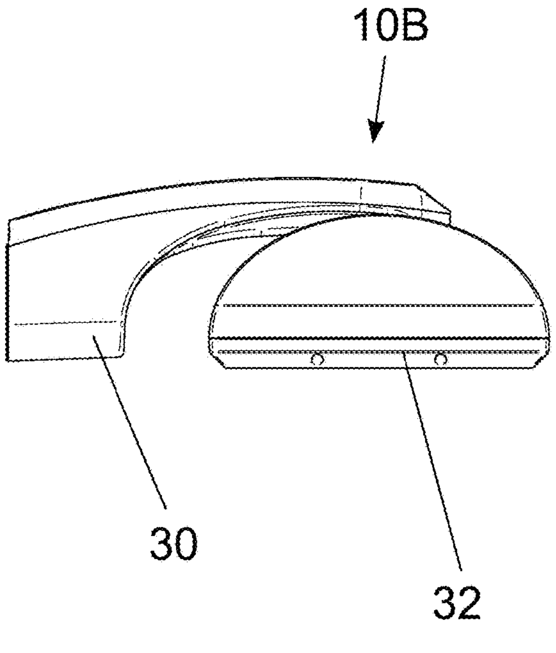
FIG. 7 is a left side view of the light fixture of FIG. 5.
Figure 8:
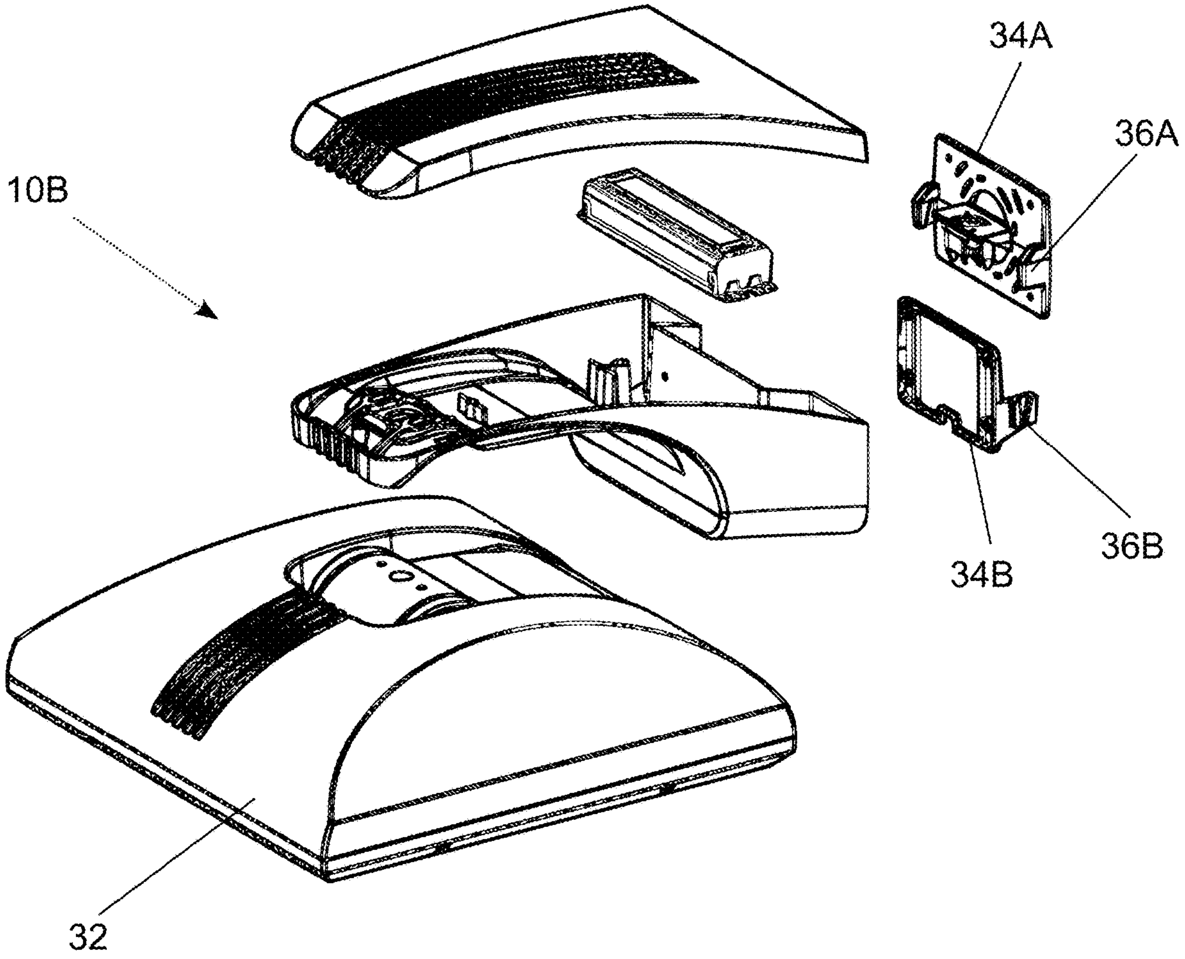
FIG. 8 is a perspective, exploded view of the light fixture of FIG. 5.
Figure 9:
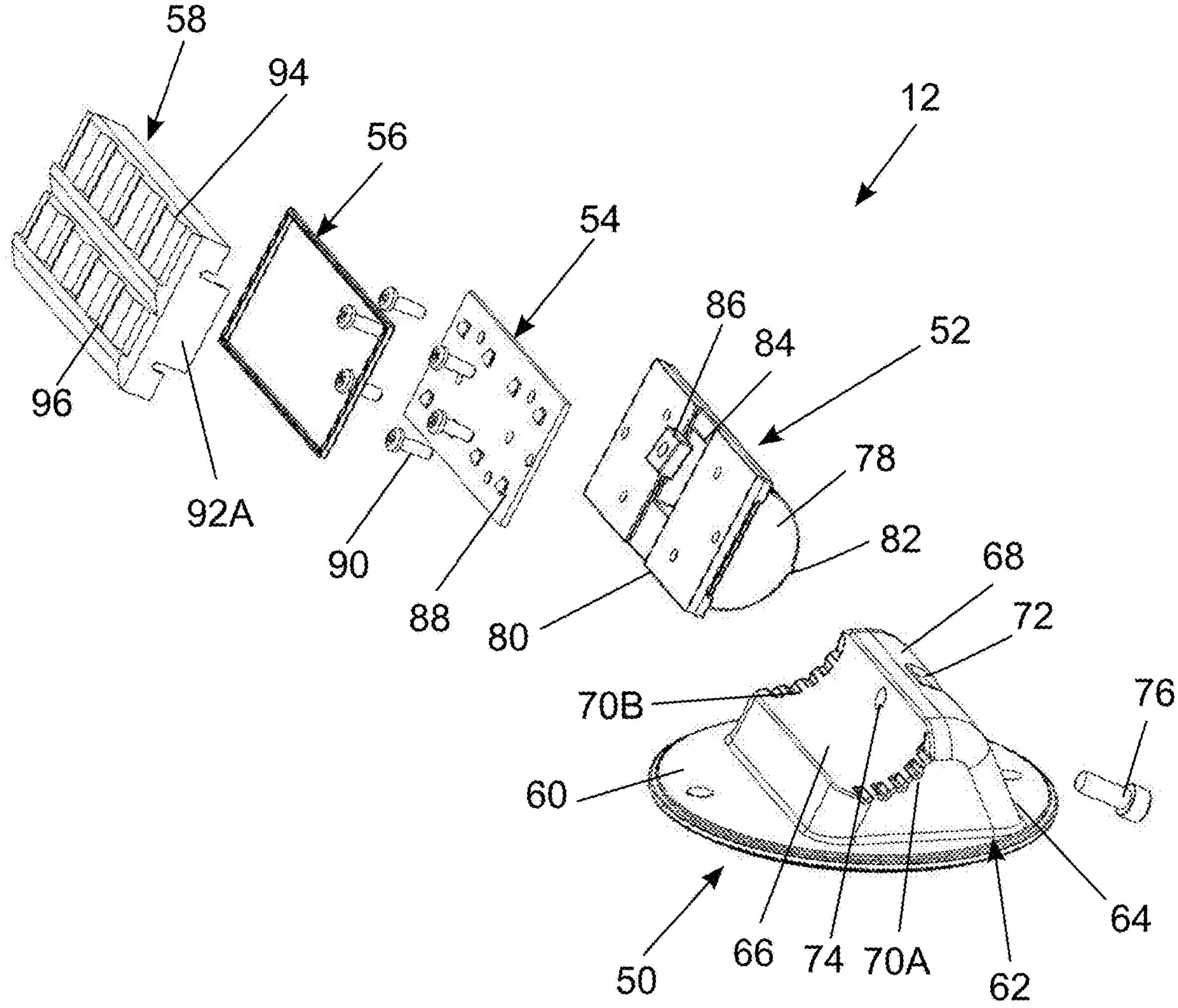
FIG. 9 is a perspective, exploded view of an exemplary lamp module.
Figure 10:
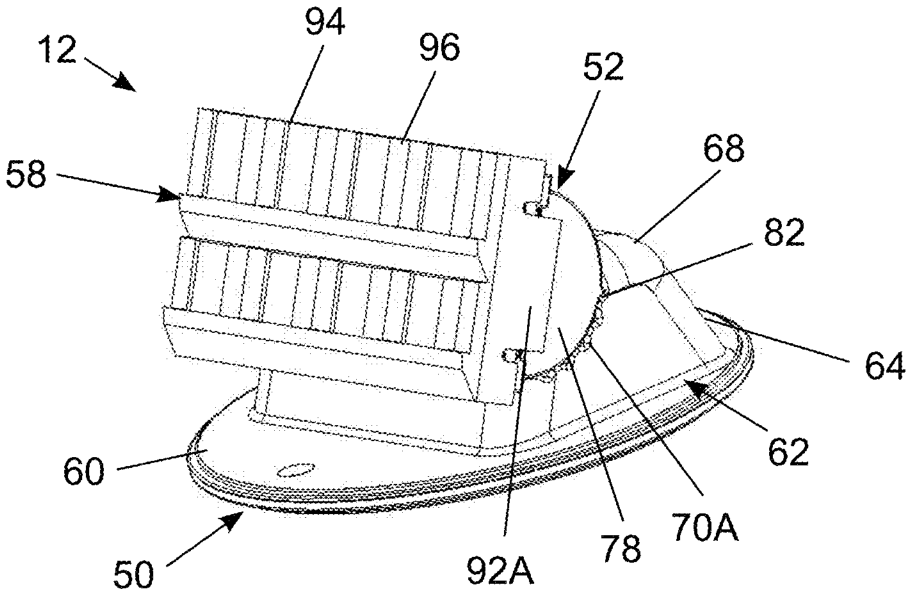
FIG. 10 is a perspective view of the lamp module of FIG. 9.
Figure 11:
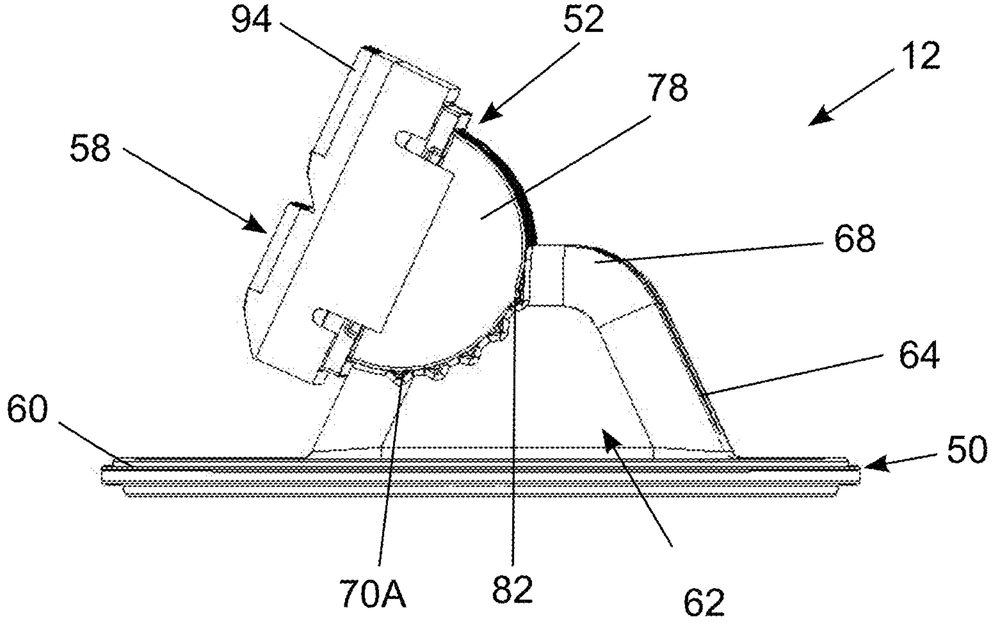
FIG. 11 is a right side view of the lamp module of FIG. 9.

As best shown in FIG. 4, the reflector 16 partially surrounds the plurality of lamp modules 12. A support 20 having a plurality of ports 22 to receive the lamp modules 12 is positioned in the reflector 16 or is integrally formed with the reflector 16. A cover 24 having a series of openings is positioned around the LED modules 12 and connected to the reflector 16, for example with mechanical fasteners, such as screws or snap-fit connectors. A gasket 26 and a frame 28 are also connected to the reflector 16, for example with mechanical fasteners. According to further embodiments, frame 28 supports an outer diffuser or lens (not shown) for protecting the modules 12 and, if desired, providing additional control of the emitted light.

FIGS. 5-8 show an exemplary wall mount housing 10B designed to be positioned with a substantially horizontal orientation extending from a wall. The housing 10B is connected to a wall or other similar structure and includes a support 30 and a reflector 32. The support 30 can include a top portion and a bottom portion that are releasably or permanently connected together, for example with mechanical fasteners. The support 30 houses various components to power, direct, and/or control the LED modules 12 as would be understood by one of ordinary skill in the art. The components may include drivers, power sources, power converters, motors, and/or communication equipment such as Wi-Fi or Bluetooth capable equipment. A bracket having a first section 34A and a second section 34B connects the support 30 to a wall or other similar structure. The first section 34A is mounted to a wall, for example through one or more mechanical fasteners and the second section 34B is connected to the support 30. The first section 34A and the second section 34B each include a pair of clips 36A, 36B that slidably mate with one another. The wall mount reflector 32 is similar to the flood light reflector 16 and may include similar components. The wall mount reflector 32 is pivotally connected to the support 30 and is selectively rotated with respect to the support 30 as discussed above.

FIGS. 9-14 show a lamp module 12 utilizing a plurality of LEDs in accordance with an exemplary embodiment. The lamp module 12 is depicted as incorporated in the flood light housing 10A and the wall mount housing 10B of FIGS. 1-8, although it may be used in any type of light fixture or housing. The lamp module 12 includes a base 50, a mount 52, an LED board 54, a gasket 56, and an optic 58.

The base 50 includes a plate 60 and a projection 62 extending from the plate 60. The projection has an angled rear surface 64, a concave bearing surface 66 rotatably receiving the mount 52, and a curved top 68 connecting the rear surface 64 and the bearing surface 66. Grooves 70A, 70B are formed in the projection 62, for example on the first and second sides of the projection 62 and/or the bearing surface 66. In accordance with the exemplary embodiment shown in FIG. 9, a first set of grooves 70A are formed on a first side of the projection 62 and a second set of grooves 70B are formed on a second side of the projection 62. In alternative embodiments, a set of grooves are formed on only a single side or a set of continuous grooves extend across the bearing surface 66. The grooves 70A, 70B are substantially V-shape with angled side walls and a planar bottom wall, although other shapes and configurations may be used. A slot 72 is positioned in the rear surface 64 surrounding an aperture 74 that extends through the bearing surface 66. The slot 72 receives a fastener 76 that extends through the aperture 74 to connect the base 50 to the mount 52.

The mount 52 is rotatably connected to the base 50 so that the orientation of the mount 52 may be adjusted by a user. The mount 52 has a convex journal surface 78 that engages the concave bearing surface 66 of the base 50 and a wall 80 that receives the LED board 54. The journal surface 78 rotates on the bearing surface 66. One or more teeth 82 extend from the journal surface 78 to engage the grooves 70A, 70B on the base 50. In various exemplary embodiments, two separate teeth 82 extend from either side of the journal surface 78, a single tooth 82 extends from one side of the journal surface 78, or a single tooth 82 extends across the journal surface 78 depending on the desired configuration. The V-shaped grooves 70A, 70B allow the tooth 82 to slide from one groove to another as selected by a user, and be retained in a desired groove. The grooves 70A, 70B are spaced to define specific angles between the mount 52 and the base 50. Indicators may be formed on one or more surfaces of the journal 78, for example the side surface, to indicate to a user the set angle. Indicators may also be positioned on the projection 62 or elsewhere on the module 12. In various exemplary embodiments, the mount 52 is rotated with respect to the base 50 between approximately 0 degrees and approximately 75 degrees in 5 degree intervals. In various alternative embodiments, the mount 52 may be continuously rotatable on the base 50 between 0 degrees and 75 degrees.

A slot 84 extends through the wall 80 and the journal surface 78 to receive the fastener 76 extending through the projection 62 and a nut 86 is connected to the fastener 76. The slot 84 is sized to allow movement of the mount 52 with respect to the base 50. In an alternative embodiment, a biasing member (not shown) may be positioned between the nut 86 and the mount 52. The biasing member provides sufficient force to bias the tooth 82 into a selected groove 70A, or in embodiments that do not utilize a groove, to substantially retain the position of the mount 52 with respect to the base 50. When changing the position of the mount 52, a user compresses the biasing member, for example by applying force to the mount 52, to remove the tooth 82 from the groove 70A. In other alternative embodiments, different connections between the base 50 and the mount 52 can be used. For example, the mount 52 can be rotatable on the base 50 by non-manual components, such as an automated configuration utilizing a motor, one or more gears, or other rotary actuators.

In various exemplary embodiments, the mount 52 acts as a heat sink to dissipate heat generated by the LEDs 88 and the LED board 54. The rear surface of the wall 80 and/or the journal surface 78 may include fins or other heat dissipating structure. In an exemplary embodiment, the journal surface 78 has a set of slots through the rear of the journal surface to form one or more heat dissipating projections. One or more apertures extend into the wall 80 to receive one or more fasteners 90 to connect the LED board 54 to the mount 52.

In an exemplary embodiment, the LED board 54 contains a printed circuit board and one or more light sources connected thereto, for example an LED light source 88. In accordance with the exemplary embodiment shown in FIG. 9, the LED board 54 includes two rows of four LEDs 88, although other configurations and any number of LEDs can be used depending on the desired light output and the optic 58. The LED board 54 is electrically connected to a power source, such as a driver (not shown) and includes one or more traces or pathways (not shown) connecting to the light sources. One or more apertures in the LED board 54 receive fasteners 90 to connect the LED board 54 to the mount 52. The LED board 54 can be various sizes and shapes as well as utilize various light sources, materials, and other configurations as would be understood by one of ordinary skill in the art when viewing this disclosure. The gasket 56 is positioned between the LED board 54 and the optic 58, for example extending around the outer edge of the LED board 54.

The optic 58 connects to the mount 52 and is positioned over the LED board 54. In an exemplary embodiment, the optic 48 includes a pair of side clips 92A, 92B and the mount 52 may have a pair of mating grooves, slots, or other structures designed to releasably receive the clips 92A, 92B. The clips 92A, 92B releasably secure the optic 58 to the mount 52 so that different optics may be interchanged as desired. Other connections can be used, including one or more fasteners. The gasket 56 positioned between the LED board 54 and the optic 58 forms a seal. The optic 58 includes one or more elements, for example light directing protrusions. In an exemplary embodiment, one light directing protrusion is aligned with each LED 88—as shown two rows of four light directing protrusions in accordance with the exemplary LED board 54. The optic 58 is made from a polymer material, for example polycarbonate or polymethyl methacrylate. In various exemplary embodiments, the optic 58 is a total internal reflection optic. Different types of optics and different materials may be utilized depending on the light source, the desired emitted light, and other design and utility considerations.

Figure 12:
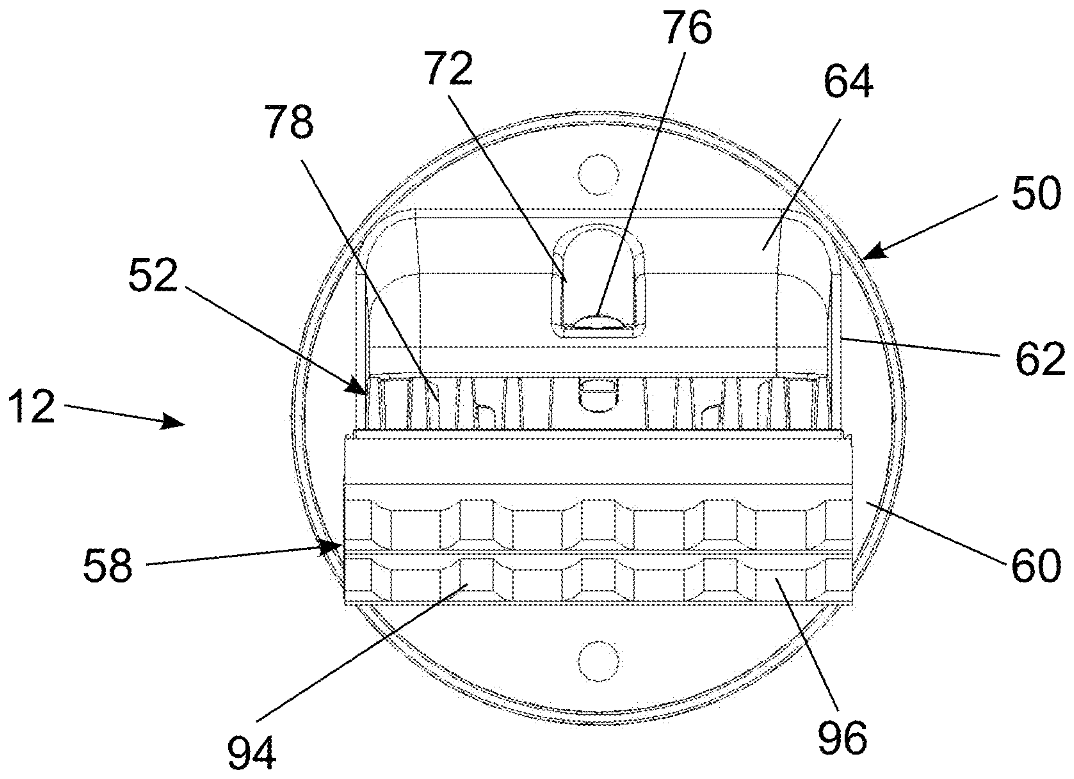
FIG. 12 is a top view of the lamp module of FIG. 9.
Figure 13:
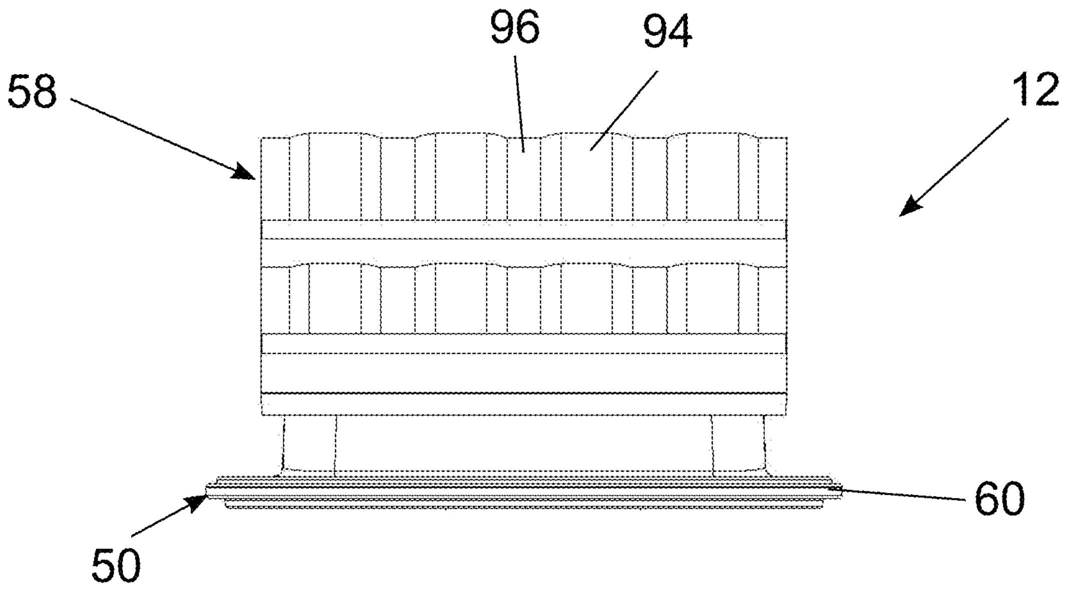
FIG. 13 is a front view of the lamp module of FIG. 9.

In the exemplary embodiment shown in FIGS. 9-15, the light directing features of the optic 58 include a series of prisms 94 having a top, a first side, and a second side. As best shown in FIG. 12, the top is planar and the first and second sides are curved, although planar sides may be used depending on the desired light output. The prisms 94 are spaced from one another by planar valleys 96.

Figure 14:
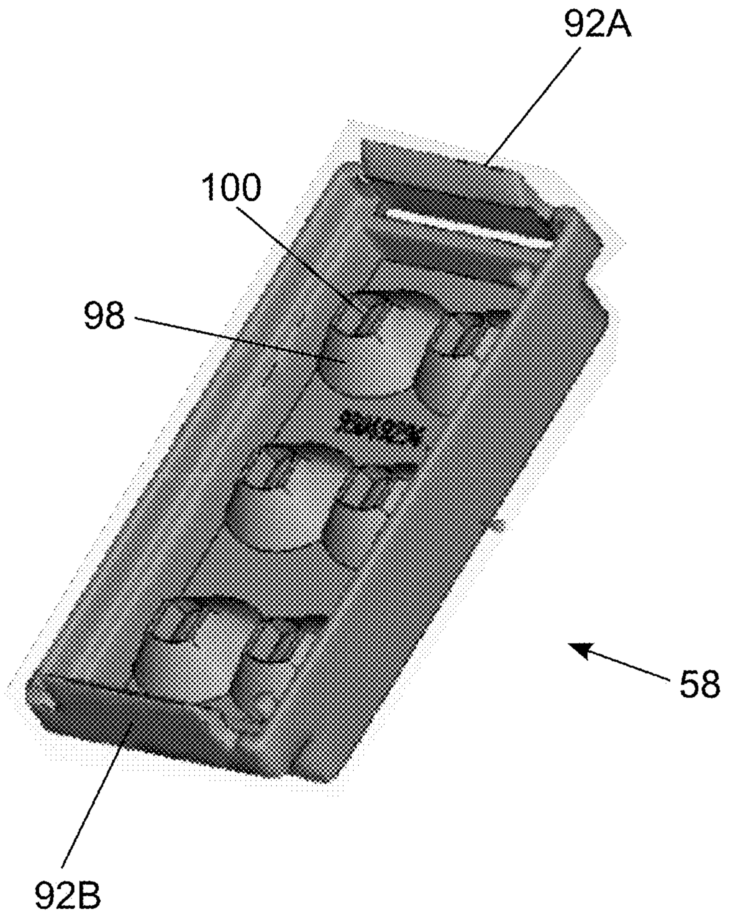
FIG. 14 is a perspective rear view of the optic of the lamp module of FIG. 9 in accordance with an exemplary embodiment.

As best shown in FIG. 14, the rear of the light directing features include a dome 98 that extends from the optic 58 towards the LED 88. The dome 98 has a substantially V-shaped top depression 100. The depression is positioned over or around the LEDs 88. The optic 58 directs the light emitted from the LEDs 88 so that light from each LED 88 and light from each lamp module 12 overlaps and blends together to provide a substantially uniform light distribution with a smooth transition.

Figure 15:
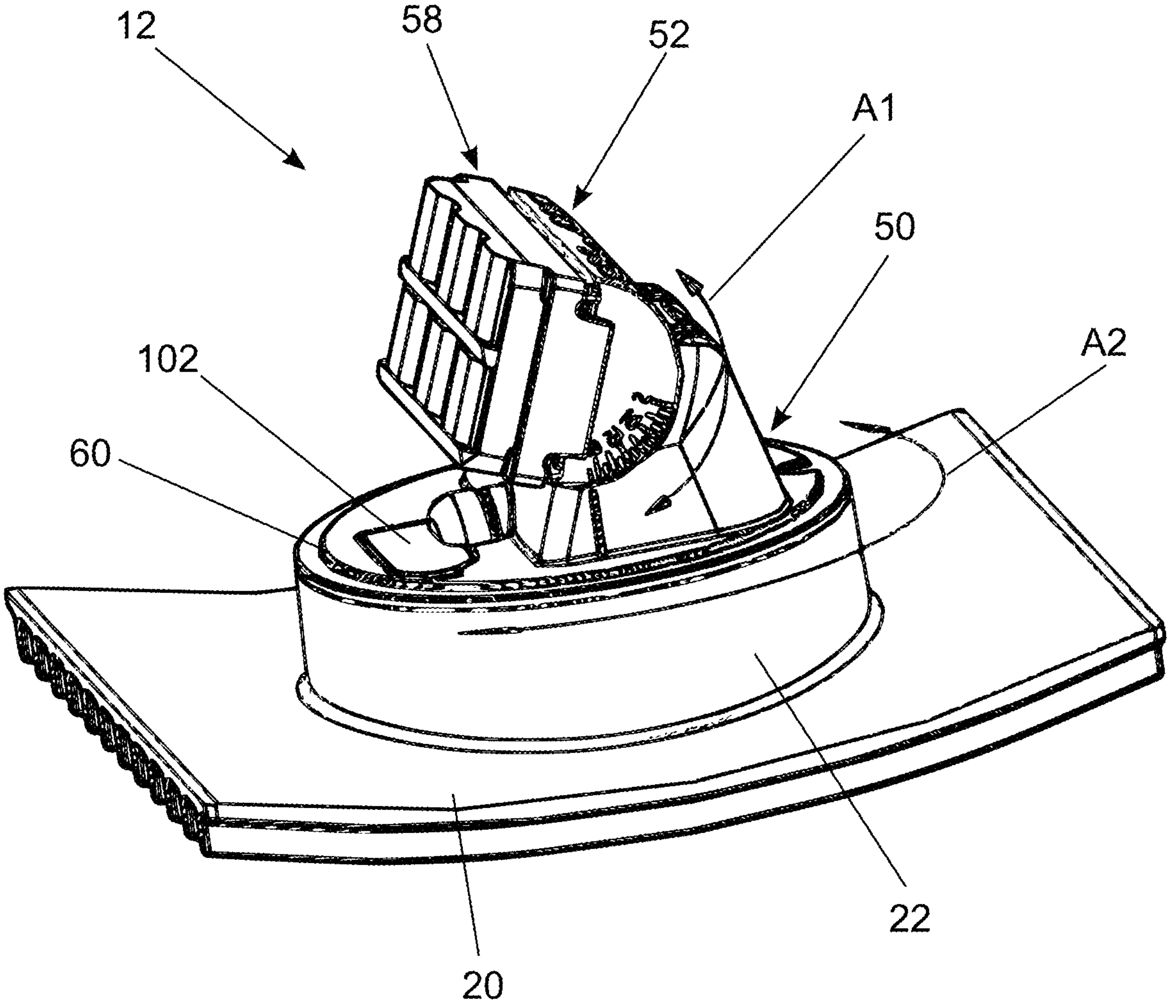
FIG. 15 is a cut-away, perspective view of the lamp module of FIG. 9 in an exemplary housing.
Figure 16:
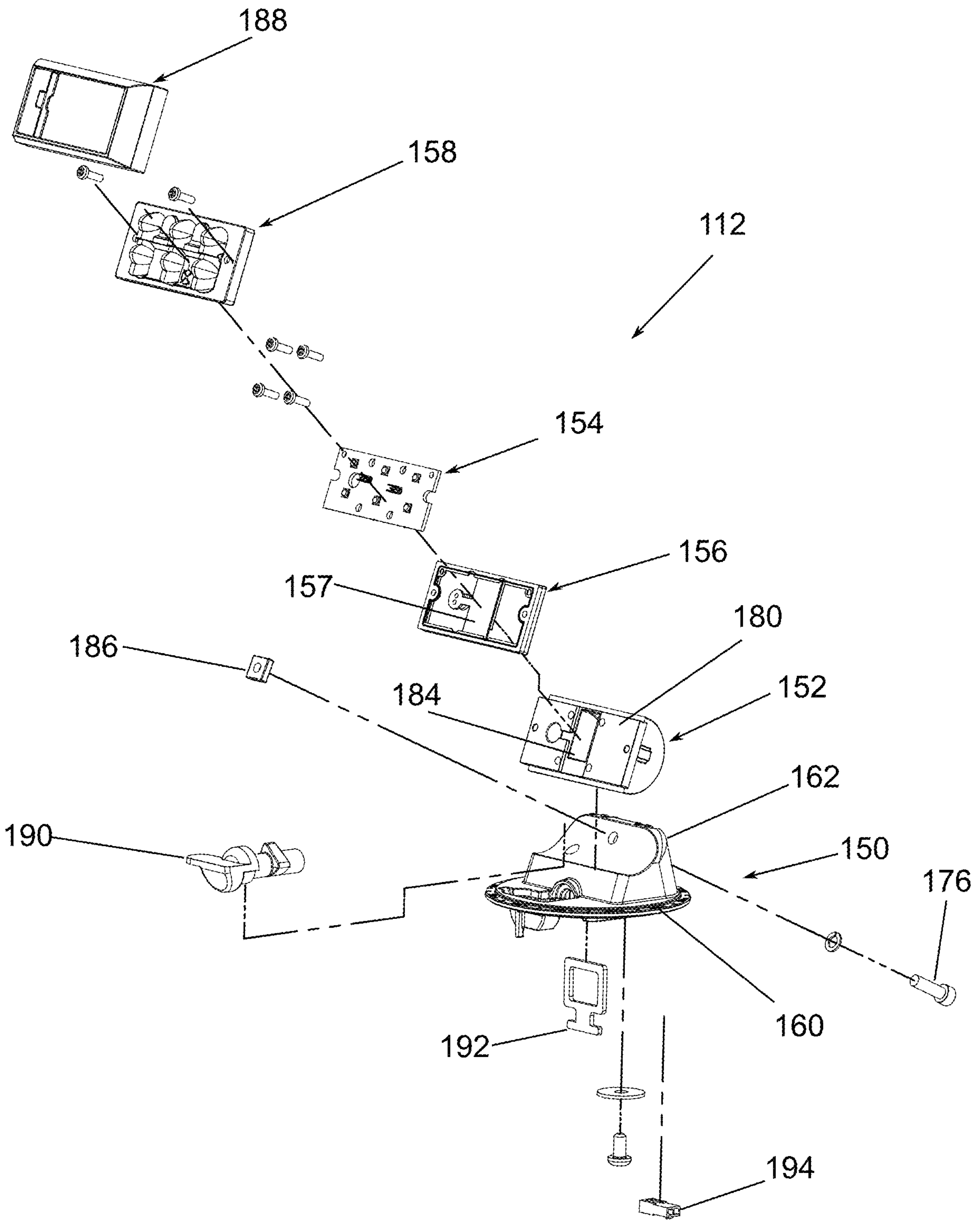
FIG. 16 is a perspective, exploded view of another exemplary lamp module.
Figure 17:
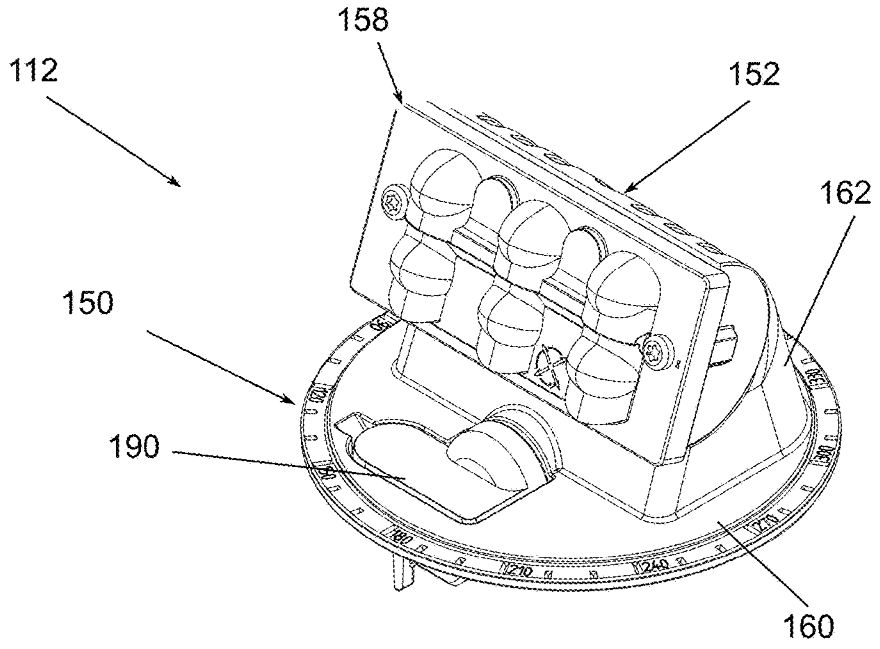
FIG. 17 is a top perspective view of the lamp module of FIG. 16.
Figure 18:
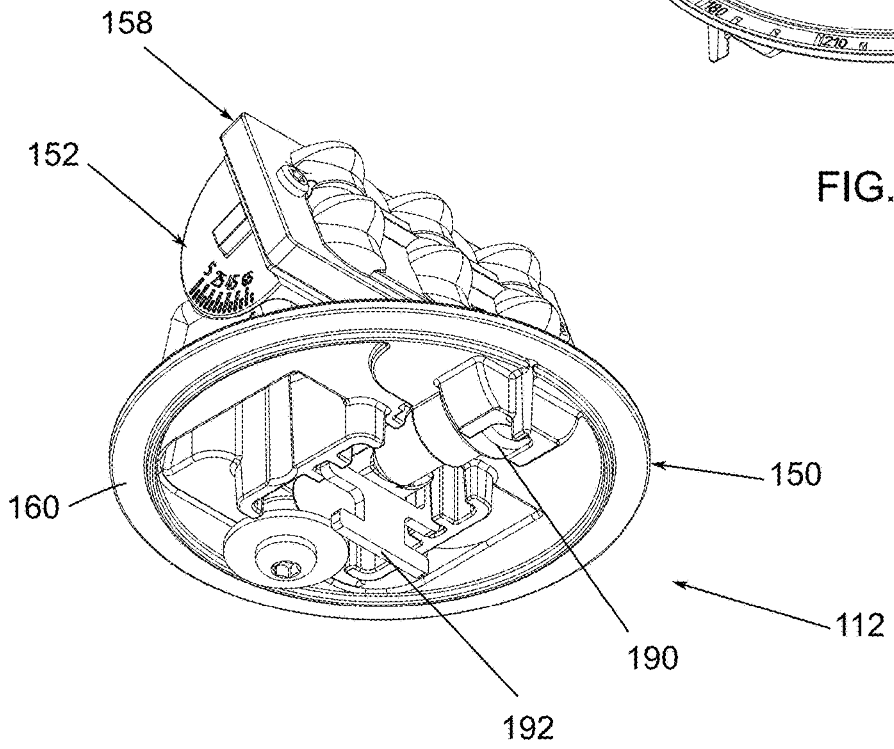
FIG. 18 is a bottom perspective view of the lamp module of FIG. 16.

FIG. 15 depicts the lamp module 12 positioned in a port 22 in accordance with an exemplary embodiment. As depicted, the mount 52 is rotatable with respect to the base 50 about a first axis of rotation as indicated by the arrows A1 and the base 50 is rotatable with respect to the support 20, for example in the port 22, about a second axis of rotation as indicated by the arrows A2. The base 50 can be rotated 360 degrees, although in alternative embodiments, the rotation of the base 50 can be limited to a predetermined range. In the exemplary embodiment shown in FIG. 14, the base 50 is manually rotated by a user and includes a cam lever 102 to selectively lock and release the position of the base 50. FIG. 15 shows the cam lever 102 flush with the plate 60 in a locked position, preventing rotation of the base 50. When rotation is desired, the user pivots the cam lever 102 to an unlocked position, allowing the base 50 to rotate. In various alternative embodiments, other locking mechanisms may be used to secure the position of the base 50.

Rotation of the mount 52 about the first axis and rotation of the base 50 about the second axis allows a user to selectively position one or more lamp modules 12 to adjust the light emitted from a given light fixture. A user may customize the orientation of the lamp modules 12 to direct light to a desired area and to adjust the distribution of the light over a given area. Because each lamp module 12 can be individually adjusted, the light fixture can be configured to emit light over a wide range of areas.

FIGS. 16-22 show another exemplary lamp module 112. The lamp module 112 includes a base 150, a mount 152, an LED board 154, a gasket 156, and an optic 158. The base 150 includes a plate 160 and a projection 162 extending from the plate 160. The projection 162 has a concave bearing surface rotatably receiving the mount 152. The mount 152 is rotatably connected to the base 150 so that the orientation of the mount 152 may be adjusted by a user. The mount 152 has a convex journal surface that engages the concave bearing surface of the base 150 and a wall 180 that receives the LED board 154. In this embodiment, no grooves or teeth are used.

Figure 19:
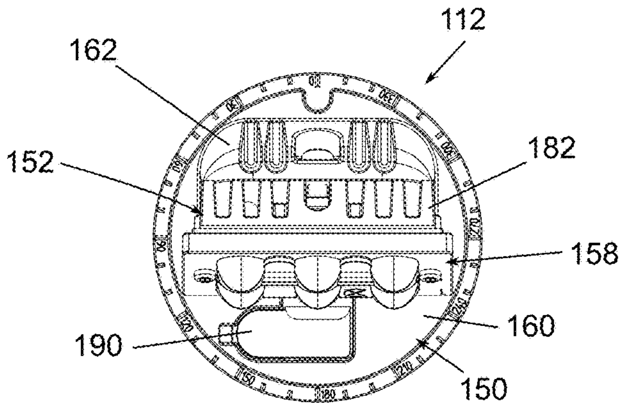
FIG. 19 is a top view of the lamp module of FIG. 16.
Figure 20:
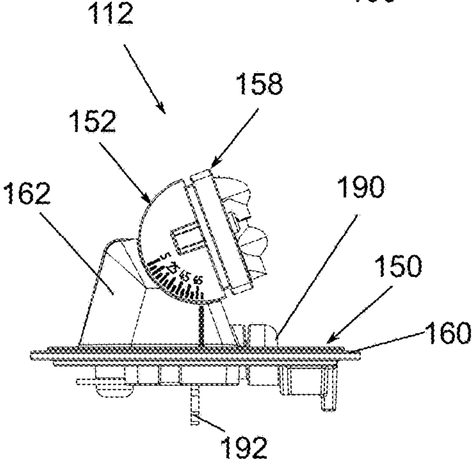
FIG. 20 is a right side view of the lamp module of FIG. 16.
Figure 21:
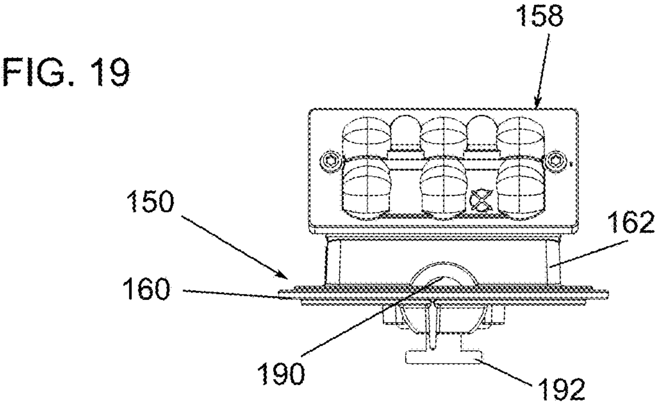
FIG. 21 is a front view of the lamp module of FIG. 16.
Figure 22:
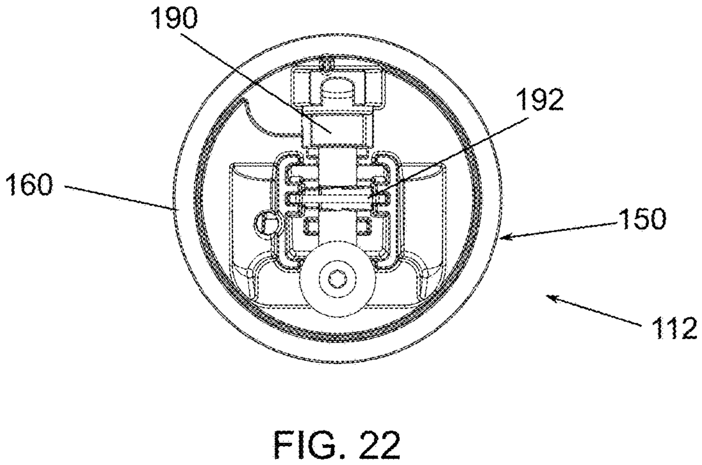
FIG. 22 is a bottom view of the lamp module of FIG. 16.
Figure 23:
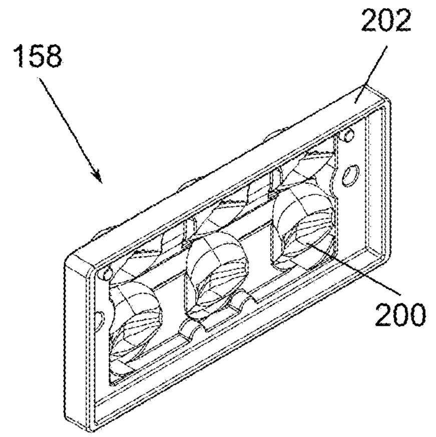
FIG. 23 is a rear perspective view of the exemplary flood light optic of FIG. 16.
Figure 24:
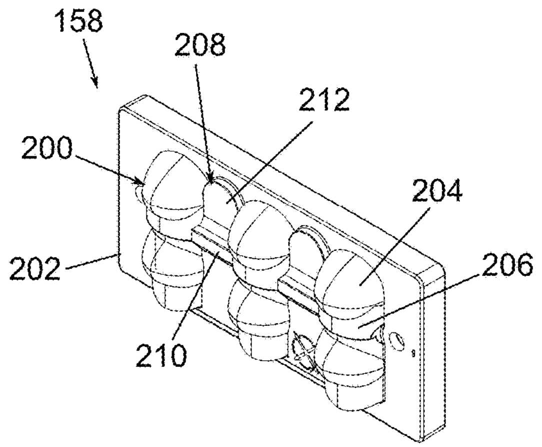
FIG. 24 is a front perspective view of FIG. 23.
Figure 25:
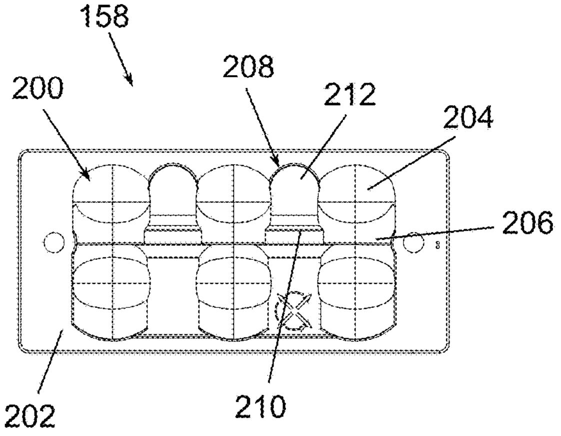
FIG. 25 is a front view of FIG. 23.
Figure 26:
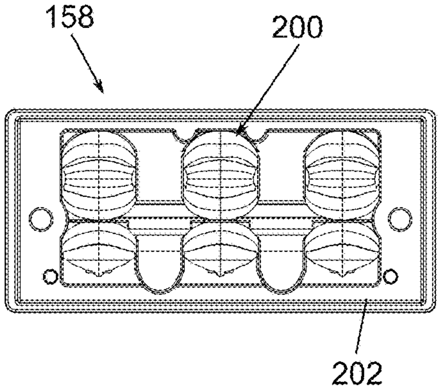
FIG. 26 is a rear view of FIG. 23.
Figure 27:
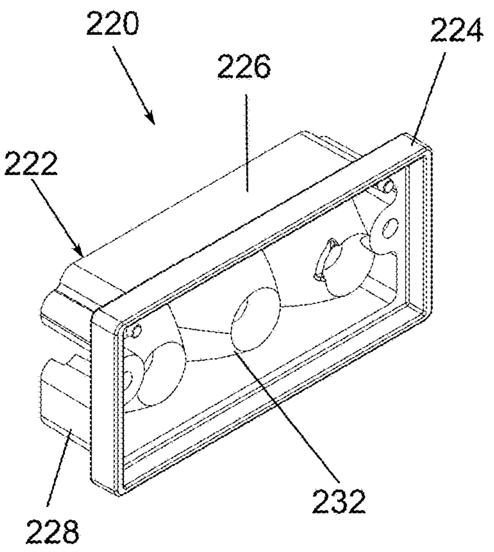
FIG. 27 is a rear perspective view of an exemplary spot light optic.
Figure 28:
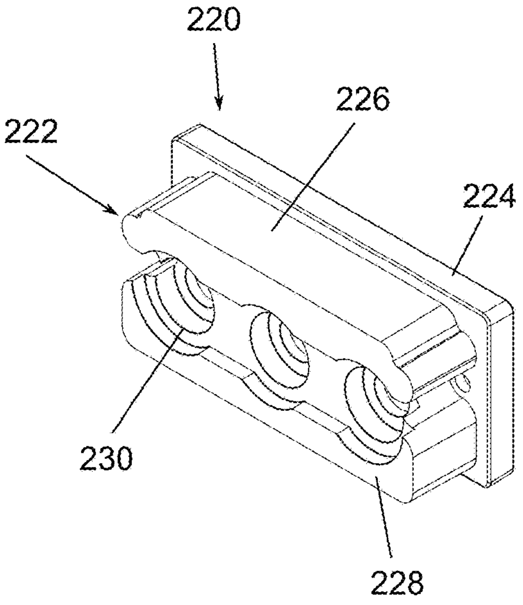
FIG. 28 is a front perspective view of FIG. 27.
Figure 29:
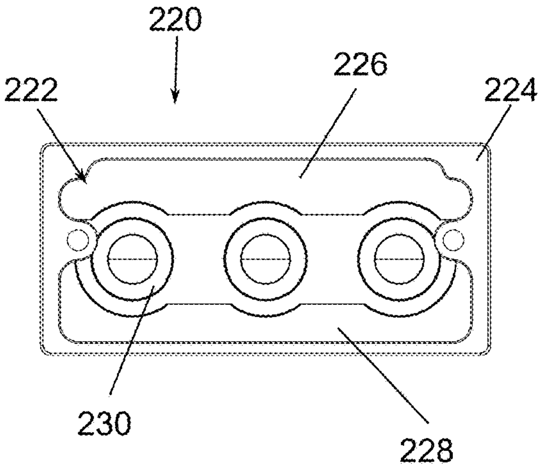
FIG. 29 is a front view of FIG. 27.
Figure 30:
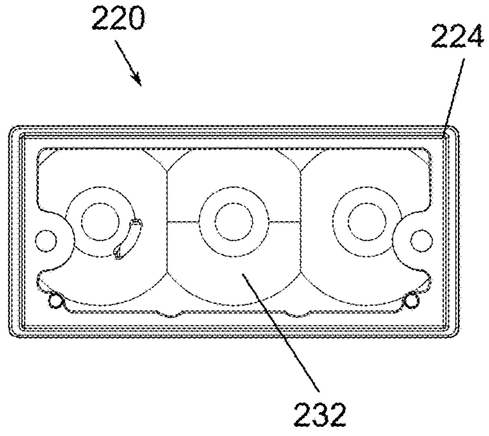
FIG. 30 is a rear view of FIG. 31.

A slot 184 having a first portion and a second portion extends through the wall 180. In an exemplary embodiment, the first portion receives a fastener 176 extending through the projection 162. A nut 186 is connected to the fastener 176 and can be selectively tightened or loosened. A user sets the angle of the mount 152 with respect to the base 150 and tightens the fastener 176 to secure the mount's 152 position. The second portion receives one or more conductors (not shown) that pass through the mount 152 and connect to the LED board 154. In various exemplary embodiments, the mount 152 acts as a heat sink to dissipate heat generated by the LED board 154. As best shown in FIG. 19, the mount 152 may include fins 182 or other heat dissipating structure.

In an exemplary embodiment, the LED board 154 contains a printed circuit board and one or more light sources. The gasket 156 is positioned between the LED board 154 and the optic 158, for example extending around the outer edge of the LED board 154. The optic 158 connects to the mount 152, for example by one or more mechanical fasteners, such as clips or screws. The gasket 156 positioned between the LED board 154 and the optic 158 forms a seal. The gasket 156 includes a sealing element 157 that covers the first and second portion of the slot 184. The sealing element 157 can include one or more openings to allow conductors to pass through the gasket.

In certain exemplary embodiments, an optional shielding cover 188 can be connected to the lamp module 112. The shielding cover 188 is placed over and at least partially around the optic 158. The size, shape, and design of the shielding cover 188 is configured to prevent or minimize light from being emitted to the sides and behind the lamp module 112. This prevents light from leaking into unwanted places, for example residential areas that may be located behind a light fixture.

The base 150 can also include a rotational lock assembly that locks the position of the base 150. The lock assembly includes a cam arm 190 and a moveable stop 192. When the cam arm 190 is in the lowered position, the stop 192 engages a plate or other structure positioned in the housing, preventing rotation of the base. When the cam arm 190 is raised, a cam engages the stop 192, moving it out of engagement with the housing and allowing a user to rotate the base 150 as desired. When the cam arm 190 is lowered, the stop 192 is moved to prevent rotation of the base 150. A conductor connector 194 can also be attached to the base to allow for quick connection and disconnection of conductors to the lamp module 112.

Figure 31:
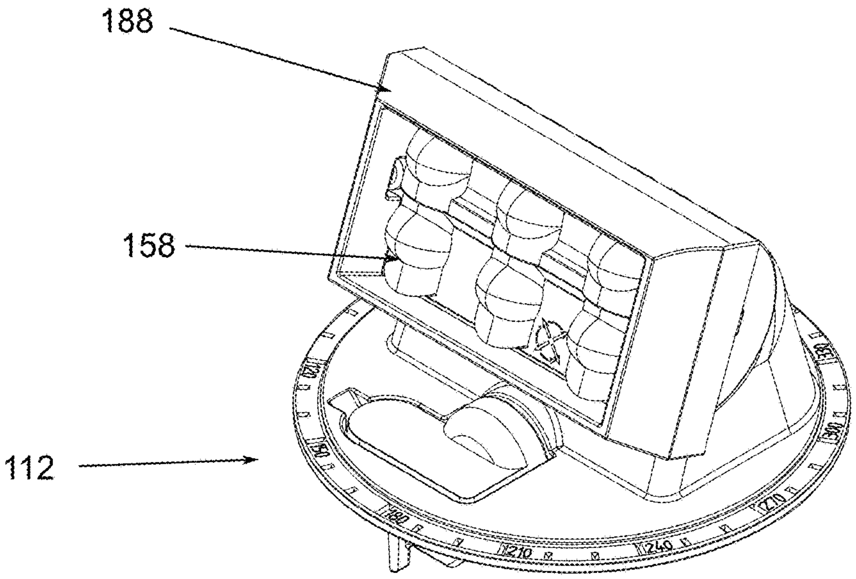
FIG. 31 is a top perspective view of the exemplary lamp module of FIG. 16, exemplary flood light optic, and the exemplary flood light shielding cover.

FIGS. 23-26 best show an exemplary embodiment of an optic 158, for example a flood lighting optic used to disperse light over an area. The optic 158 includes one or more elements, for example light directing protrusions 200 extending from a base 202. In an exemplary embodiment, one light directing protrusion 200 is aligned with each LED. The light directing protrusions 200 include a curvilinear top portion 204 and a curvilinear bottom portion 206. An intermediate projection 208 also extends from the base 202 between the light directing protrusions 200. The intermediate projection 208 includes a rectilinear portion 210 and a curvilinear portion 212. The base 202 includes an edge that extends around the LED board 154. FIG. 31 shows the lamp module 112 with the optic 158 and the shielding cover 188.

Figure 32:
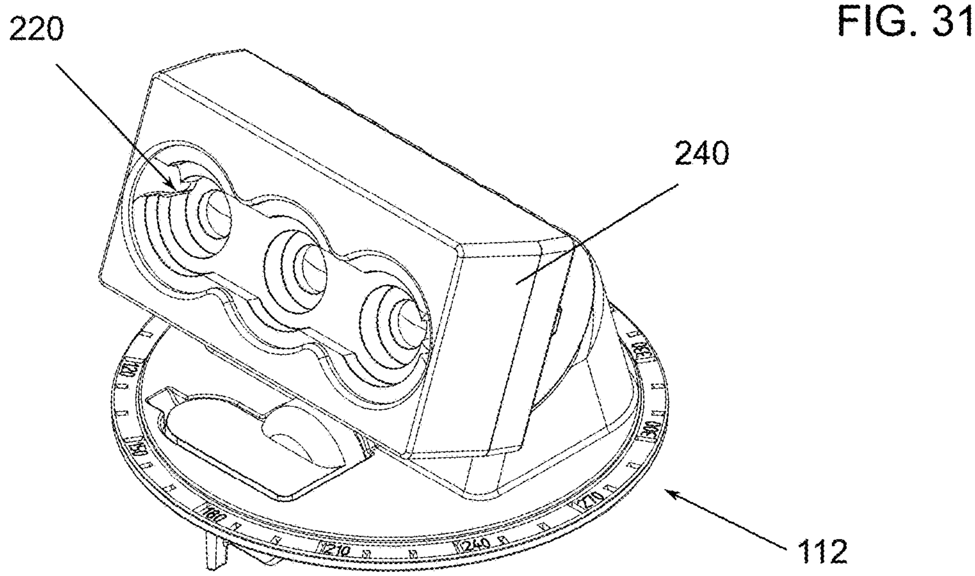
FIG. 32 is a top perspective view of the exemplary lamp module of FIG. 16, exemplary spot light optic, and the exemplary spot light shielding cover.

FIGS. 27-30 show another exemplary embodiment of an optic 220, for example a spot lighting optic used to focus light on a specific area. The optic 220 includes a light directing protrusion 222 extending from a base 224. The light directing protrusion 222 includes a top brim 226 and a bottom brim 228 positioned around circular recesses 230. Truncated cylinders 232 extend from the base towards the light board 154 with openings that receive, or are positioned proximately over, an LED. FIG. 32 shows the lamp module 112 with the spot light optic 220 and a second shielding cover 240.

According to these and other embodiments, certain light fixtures can be used for different lighting applications. For example, exterior light distribution can be divided between Type I-V light distributions. Type I provides a narrow linear beam distribution for lighting paths and walkways. Type II provides a linear distribution wider than Type I to accommodate wider lengths such as roadways. Type III provides a wider beam distribution than Types I and II to illuminate a larger area that is directed both downward and outward from the light source. Type IV mostly directs light outwardly and is designed to be used at the perimeter of areas or mounted on walls. Type V provides a substantially uniform distribution from all sides of the light source, typically in a square or circular pattern. By adjusting the orientation of the lamp modules 12, a user can obtain these general light distribution, and other more specific customizable light distributions, with a single light fixture.

Although the lamp modules 12, 112 are illustrated as manually positioned, various alternative embodiments may utilize automated and/or remote positioning (not shown). The rotation of a reflector 16, 32, the base 50, and the mount 52 can be achieved through one or more motors, such as a stepper motor, and a gear or other rotary positioning device. The automated positioning may be controlled locally at each light fixture or remotely, for example from a separate computing device such as a cell phone, tablet, laptop, desktop, or remote server. Instructions for controlling the motor(s) may be sent through a wired connection or wirelessly, for example through Wi-Fi or Bluetooth communication interface. Further controls are also provided to allow a user to select light distribution from preset configurations and to modify the position of each module individually.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms “front,” “rear,” “upper,” “lower,” “upwardly,” “downwardly,” and other orientational descriptors are intended to facilitate the description of the exemplary embodiments of the present application, and are not intended to limit the structure of the exemplary embodiments of the present application to any particular position or orientation. Terms of degree, such as “substantially” or “approximately” are understood by those of ordinary skill to refer to reasonable ranges outside of the given value, for example, general tolerances associated with manufacturing, assembly, and use of the described embodiments.

What is claimed:

1. A lamp module for a light fixture comprising:

a rotatable base having a plate and a projection extending from the plate;

a mount rotatably connected to the projection, the mount having a front surface and a back surface, a heat sink being disposed on the back surface;

a plurality of light emitters connected to the front surface of the mount; and an optic positioned over the plurality of light emitters, the plurality of light emitters comprising a first light emitter and at least a second light emitter, wherein the optic comprises a first light directing protrusion aligned only with the first light emitter, and at least a second light directing protrusion aligned with the at least a second light emitter;

wherein a position of at least one of the rotatable base and the mount is configured to be adjusted via at least one motor and at least one gear at least partially in response to wireless receipt of at least one control signal from a remote computing device.

2. The lamp module of claim 1, wherein the base is rotatable 360 degrees about a first axis.

3. The lamp module of claim 2, wherein the mount is rotatable between approximately 0 and approximately 75 degrees about a second axis different from the first axis.

4. The lamp module of claim 1, wherein the base and the mount are manually rotatable.

5. The lamp module of claim 1, wherein the projection includes a concave bearing surface and the mount includes a convex journal surface.

6. The lamp module of claim 5, wherein the projection includes a set of grooves and the journal surface includes a tooth selectively engaging the grooves.

7. The lamp module of claim 1, wherein the base includes a cam lever selectively locking the rotation of the base.

8. The lamp module of claim 1, wherein the mount includes a heat fin.

9. The lamp module of claim 1, wherein the plurality of light emitters includes a circuit board and two or more LEDs connected to the circuit board.

10. A lamp module for a light fixture comprising:

a rotatable base having a projection;

a mount rotatably connected to the projection, the mount having a front surface and a back surface, a heat sink being disposed on the back surface;

a circuit board connected to the front surface of the mount having a plurality of LEDs; and an optic having a light directing element positioned over the plurality of LED, the plurality of LEDs comprising a first LED and at least a second LED, wherein the optic comprises a first light directing protrusion aligned only with the first LED, and at least a second light directing protrusion aligned with the at least a second LED;

wherein a position of at least one of the rotatable base and the mount is configured to be adjusted via at least one motor and at least one gear at least partially in response to wireless receipt of at least one control signal from a remote computing device.

11. The lamp module of claim 10, wherein the circuit board includes a first row of LEDs and a second row of LEDs.

12. The lamp module of claim 10, wherein the optic includes a flood light optic releasably connected to the mount.

13. The lamp module of claim 12, wherein the optic includes a spot light optic releasably connected to the mount.

14. The lamp module of claim 10, wherein the optic includes a clip connecting the optic to the mount.

15. The lamp module of claim 10, wherein a gasket is positioned between the optic and the circuit board.

16. The lamp module of claim 10, wherein a shielding cover is positioned over the optic.

17. A light fixture comprising:

a housing having a support; and a lamp module having a base rotatably connected to the support, a mount rotatably connected to the base, the mount having a front surface and a back surface, a heat sink being disposed on the back surface, a light emitting device connected to the front surface of the mount having a plurality of LEDs, and an optic positioned over the plurality of LEDs, the plurality of LEDs comprising a first LED and at least a second LED, wherein the optic comprises a first light directing protrusion aligned only with the first LED, and at least a second light directing protrusion aligned with the at least a second LED;

wherein a position of at least one of the base and the mount is configured to be adjusted via at least one motor and at least one gear at least partially in response to wireless receipt of at least one control signal from a remote computing device.

18. The light fixture of claim 17, wherein a reflector is pivotally connected to the support.

19. The light fixture of claim 18, wherein the reflector pivots between approximately −5 degrees and approximately +30 degrees.

20. The light fixture of claim 17, wherein the base is rotatable 360 degrees about a first axis and the mount is rotatable between approximately 0 and approximately 75 degrees about a second axis different from the first axis.

* * * * *